US009258557B2

(12) United States Patent
Bocus et al.

(10) Patent No.: US 9,258,557 B2
(45) Date of Patent: Feb. 9, 2016

(54) RATE OPTIMIZATION FOR SCALABLE VIDEO TRANSMISSION

(71) Applicant: Kabushiki Kaisha Toshiba, Tokyo (JP)

(72) Inventors: Mohammud Zubeir Bocus, Bristol (GB); Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 358 days.

(21) Appl. No.: 13/833,603

(22) Filed: Mar. 15, 2013

(65) Prior Publication Data

US 2013/0243082 A1  Sep. 19, 2013

(30) Foreign Application Priority Data

Mar. 15, 2012  (GB) .................................. 1204608.2

(51) Int. Cl.
*H04N 7/26* (2006.01)
*H04N 19/10* (2014.01)
*H04N 19/115* (2014.01)
*H04N 19/164* (2014.01)
*H04N 19/187* (2014.01)
*H04N 19/30* (2014.01)
*H04N 19/124* (2014.01)

(52) U.S. Cl.
CPC ....... *H04N 19/00006* (2013.01); *H04N 19/115* (2014.11); *H04N 19/164* (2014.11); *H04N 19/187* (2014.11); *H04N 19/124* (2014.11); *H04N 19/30* (2014.11)

(58) Field of Classification Search
CPC . H04N 19/187; H04N 19/164; H04N 19/115; H04N 19/30; H04N 19/124
USPC .................................................... 375/240.02
See application file for complete search history.

(56) References Cited

U.S. PATENT DOCUMENTS

| 6,275,531 B1 * | 8/2001 | Li ............................. 375/240.12 |
| 8,630,310 B2 * | 1/2014 | Sethakaset et al. ........... 370/469 |
| 2008/0247468 A1 * | 10/2008 | Perez de Notario ..... 375/240.26 |

(Continued)

FOREIGN PATENT DOCUMENTS

| JP | 2010-34730 | 2/2010 |
| WO | WO 2011/097755 A1 | 8/2011 |

(Continued)

OTHER PUBLICATIONS

Li et al., A convex approximation approach to weighted sum rate maximization of multiuser MISO interference channel under outage constraints, May 22-27, 2011, Speech and Signal Processing (ICASSP), 2011 IEEE International Conference on Acoustics, pp. 3368-3371.*

(Continued)

*Primary Examiner* — Jay Patel
*Assistant Examiner* — Francis G Geroleo
(74) *Attorney, Agent, or Firm* — Oblon, McClelland, Maier & Neustadt, L.L.P.

(57) ABSTRACT

The disclosure concerns encoding of information, such as content information for streaming, in a scalable manner. That is, a base layer of encoded content can be supplemented by one or more enhancement layers as channel capacity allows. Definition of bounds for the base layer and the one or more enhancement layers is governed by long-term channel information, while selection of layers for transmission at a particular time is governed by short-term, or instantaneous, channel state considerations.

10 Claims, 5 Drawing Sheets

(56) References Cited

U.S. PATENT DOCUMENTS

| | | | |
|---|---|---|---|
| 2010/0086024 A1* | 4/2010 | Zhang et al. | 375/240.02 |
| 2010/0293584 A1* | 11/2010 | Civanlar et al. | 725/109 |
| 2012/0307886 A1* | 12/2012 | Agarwal et al. | 375/240.02 |
| 2013/0263201 A1* | 10/2013 | Chung-How et al. | 725/116 |

FOREIGN PATENT DOCUMENTS

| WO | WO 2012/001339 A1 | 1/2012 |
|---|---|---|
| WO | WO2012076904 A1 * | 6/2012 |

OTHER PUBLICATIONS

Office Action issued Dec. 16, 2014 in Japanese Patent Application No. 2013-052926 (with English language translation).

Search Report issued Jul. 6, 2012 in United Kingdom Application No. GB1204608.2, filed on Mar. 15, 2012.

Office Action issued Apr. 1, 2014 in Japanese Patent Application No. 2013-052926 (with English translation).

\* cited by examiner

RATE OPTIMIZATION FOR SCALABLE VIDEO TRANSMISSION

FIELD

Embodiments described herein relate to the transmission of scalable data, particularly but not exclusively scalable video data.

BACKGROUND

Scalable video coding (SVC) is a video encoding technique, in which a video sequence is encoded as a hierarchy of video layers consisting of one base layer and at least one enhancement layer. This type of video encoding allows a video transmission system to adapt to changes in channel conditions by selectively discarding video layers or packets. Numerous existing algorithms for discarding video layers with reducing bandwidth exist. However, such algorithms, on their own, rely on the base layer rate being satisfied at all times.

If the base layer rate cannot be satisfied under a given channel condition, the base layer will not be transmitted. In that case, video playback will not be possible at the receiver—in fact, no video data will have been transmitted.

DETAILED DESCRIPTION

Figure 1:
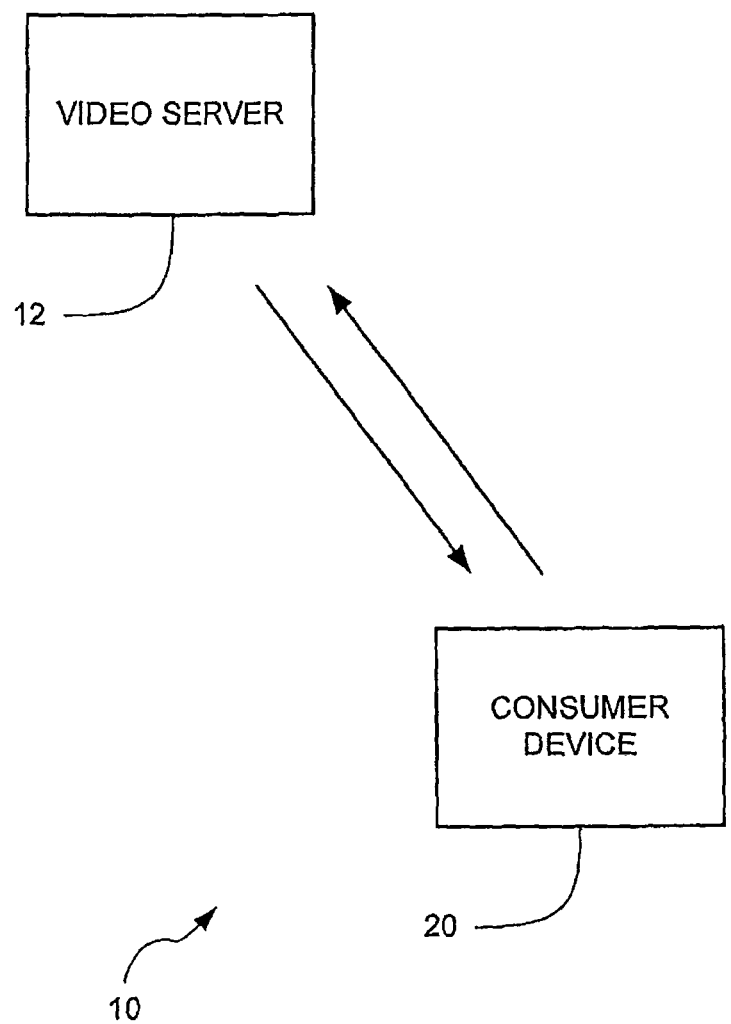
FIG. 1 is a schematic block diagram of a communications system in accordance with an embodiment described herein.

Embodiments described herein are concerned with a means of specifying extractable rate points in a scalable video bitstream based on the fading distribution of the channel to optimise an objective function related to the communication system. One approach may be to set an objective of the maximisation of the expected transmission rate. Such an objective may result in a lower probability of the minimum QoS not being supported by the communication channel as well as a higher spectrum utilisation.

Given the current problem of spectrum under utilisation, earlier described approaches are evidently not optimal.

To increase spectrum utilisation, certain embodiments disclosed herein provide an algorithm for maximising the expected transmission rate for scalable video sequences by considering the probability of the transmitter sending different number of video layers. The increase in expected transmission rate may also lead to a lower probability of the base layer rate not being satisfied. Consequently, the probability of continuous playback, irrespective of the channel fading, is increased.

A particular embodiment described herein concerns a method for specifying the extractable rate points in a scalable video sequence based on communication channel conditions.

Another particular embodiment described herein concerns a method for specifying the video encoding parameters of a scalable video sequence based on statistics of the channel.

The extractable rate points in a scalable video transmission may be chosen in order to maximise the expected rate of the transmission.

Embodiments disclosed herein present a numerical approach to solve the rate-optimisation problem at very low complexity.

An embodiment described herein provides a video transmission architecture implementing a video encoding process, the video encoding process occurring after gathering channel statistics.

The number of extractable rate points in the scalable sequence may be defined under given channel conditions.

Certain embodiments may have particular implementation in CCTV and surveillance, or in video conferencing. However, no embodiment is limited to such uses.

One aspect of the disclosure concerns encoding of information, such as content information for streaming, in a scalable manner. That is, a base layer of encoded content can be supplemented by one or more enhancement layers as channel capacity allows. Definition of bounds for the base layer and the one or more enhancement layers is governed by long-term channel information, while selection of layers for transmission at a particular time is governed by short-term, or instantaneous, channel state considerations.

In general terms, therefore, the disclosure concerns encoding the information to be delivered on a channel with reference to a long-term view as to the capabilities of the channel, whereas use of the channel once encoding has taken place is governed by an more short-term perspective on the performance of the channel at a particular time.

An aspect of the disclosure concerns a method of processing a source data item to produce a transmission data item for transmission on a communications channel, the transmission data item bearing information defining a playback content item, the method comprising encoding information defining a source data item into a plurality of layer data items, including a base layer item and an enhancement layer item, the base layer item defining a playback content item corresponding to said source data item at a first quality level and the enhancement layer item providing information to define, with said base layer, a playback content item corresponding to said source item at a quality level higher than the first quality level, the encoding comprising determining rate values defining transmission rates corresponding, respectively, to transmission of said base layer item alone or said base layer item and said enhancement layer item, on the basis of a prevailing channel condition of the communications channel, and producing said base layer item and said enhancement layer item on the basis of said determined rate values, extracting, from said encoded layer items, a set of layer items for transmission, the extracting being on the basis of current channel information for the communications channel, and assembling the selected encoded layer items into a data sequence for transmission.

Rate values can be determined by optimising to maximise an expected transmission rate on the basis of prevailing channel information describing past channel transmission rate performance. The optimising may comprise maximising a weighted sum of probabilities of transmitting at specific rates. The maximising may comprise performing a convex optimisation.

The encoding may comprise encoding the source data item into the base layer item, the enhancement layer item, and further one or more successive enhancement layer items, the or each of the successive enhancement layer items being combinable with preceding layer items to produce a playback content item of successively higher quality than the preceding layer item.

The number of rate values to be determined may be predetermined. On the other hand, the number of rate values may be determined by reference to prevailing channel conditions. In that case, the number of rate values may be determined by optimisation with reference to prevailing channel conditions.

Another aspect of the disclosure concerns an encoder for processing a source data item to produce a transmission data item for transmission on a communications channel, the transmission data item bearing information defining a playback content item, the encoder comprising data processing means operable to encode information defining a source data item into a plurality of layer data items, including a base layer item and an enhancement layer item, the base layer item defining a playback content item corresponding to said source data item at a first quality level and the enhancement layer item providing information to define, with said base layer, a playback content item corresponding to said source item at a quality level higher than the first quality level, the data processing means comprising a rate value determining means operable to define transmission rates corresponding, respectively, to transmission of said base layer item alone or said base layer item and said enhancement layer item, on the basis of a prevailing channel condition of the communications channel, and wherein said data processing means is operable to produce said base layer item and said enhancement layer item on the basis of said determined rate values, extracting means for extracting, from said encoded layer items, a set of layer items for transmission, the extracting being on the basis of current channel information for the communications channel, and data sequence assembly means operable to assemble said selected encoded layer items into a data sequence for transmission.

Any aspect of the disclosure as set out above or below may be embodied in the form of a computer program product, comprising computer executable instructions which, when executed by a general purpose computer, will cause the computer to operate either to perform a method as described herein or as an encoder as described herein. It will be understood that the computer program product may be in the form of a computer readable medium, such as an optical or magnetic storage medium, or an electronic storage device, or may be delivered in the form of a signal, such as a download. The product may comprise a self-contained computer program, or may integrate with existing, pre-loaded computer programs, and may therefore be a plug-in, an upgrade to existing program facilities, or an application to operate in conjunction with other applications and operating system facilities. The product may also comprise hardware components specifically designed for use in performing a method as disclosed herein, or a portion of such a method, and so the product may comprise software, firmware, hardware or a combination thereof.

Scalable video coding, such as the scalable extension of the H.264/AVC standard which supports coarse and medium grain scalability, is a means of video encoding that enables an encoded sequence to adapt to changes in channel conditions and support heterogeneous devices. This is achieved by encoding the video as a hierarchy of video layers. Assuming that a total of L video layers or a total of L extractable points are present, the possible rates at which the video transmitter can operate are defined in the rate vector $$r=[r_1, r_2, \ldots, r_L]^T$$

where $r_l$ is the base layer rate, while $r_1$ is the rate required for extracting the first l layers. For instance, $r_2$ is the required rate for transmitting the base layer and the first enhancement layer. Depending on the channel conditions, assessed through control channel information, the transmitter will send only a specific number of video layers, which can be decoded at the receiver. It should be noted that the receiver can determine the number of video layers present in the received sequence by examining the header information of received data.

In existing scalable video transmission architectures and algorithms, decisions on which higher enhancement layer data should be dropped are made based on observed channel conditions. Alternatively, algorithms have been derived for allocating channel resources, such as power and bandwidth, such that the maximum number of video layers is transmitted. Such methods are often termed link-adaptive. On the other hand, existing rate control techniques aim at specifying the video encoding parameters of a scalable video sequence to optimise the video encoding process irrespective of the channel conditions.

Although link-adaptive methods provide an efficient approach to adapting the transmission rate, and thus received video quality, in response to changes in the channel conditions, it is likely that, in poor channel environments, the channel may not even support the base layer rate. In such a situation, there is no benefit in assigning any channel resources to the transmission since transmitting part of the base layer will not result in a decodable sequence at the receiver. This will only be a waste of transmission power. Thus, if the channel environment is sufficiently poor that no viable transmission can be made, the end user will not receive data, and the channel will remain idle for that period of time. It is not desirable for the useable radio spectrum to lie idle, since resource is generally limited In a system not employing scalable video coding, the sequence for transmission is encoded as a single layer. In such a system, a typical response to poor channel conditions would be to encode the video at lower quality for later frames, where lower quality videos require lower rate. However, there is no systematic approach to finding the rate at which the video should be encoded.

Embodiments described below present a rate adaptive scheme for scalable video sequences when the sequences are transmitted from a source to a destination in a communication system.

Rate adaptation is the process by which video encoding parameters, such as quantisation parameters (QPs), are defined to meet a given channel condition. Given the one-to-one relationship between video layer rates and QPs, specifying the rate for extracting the different number of layers would allow for the QP values to be specified as well.

In SVC, correctly receiving more video layers results in higher video quality. At the transmitter, the decision as to the number of video layers to be transmitted depends on the mutual information of the channel. For instance, if the mutual information of the channel is greater than $r_L$, the transmitter will most likely transmit all video layers. Similarly if the mutual information of the channel lies between $r_l$ and $r_{l+1}$, layers up to layer l will be transmitted. However, if the transmission channel cannot support the base layer rate, i.e., the mutual information of the channel is less than $r_1$, then no video would be transmitted, in which case, an outage would occur. Such occurrences lower the average transmission rate of the system, which is clearly inefficient in terms of spectrum usage.

FIG. 1 illustrates a communications system 10 in which a video stream server 12 is presented in communication with a consumer device 20. The interconnection between the server 12 and the consumer device 20 is illustrated by way of a single "communications channel" but it will be understood that any practical system may include many intermediate communication stages, such as internet based communication, fibre optic connection, cabling, satellite based communication and wireless communication, in order to effect a link between the two devices.

In the illustrated system 10, channel information is fed back from the consumer device 20 to the server 12, comprising reports of channel quality experienced by the consumer device 20. The reader will appreciate that it may not, in all circumstances, be necessary to obtain information concerning channel quality along the whole communication path, and that information may be fed back to the server 12 from any intermediate point if appropriate.

Figure 2:
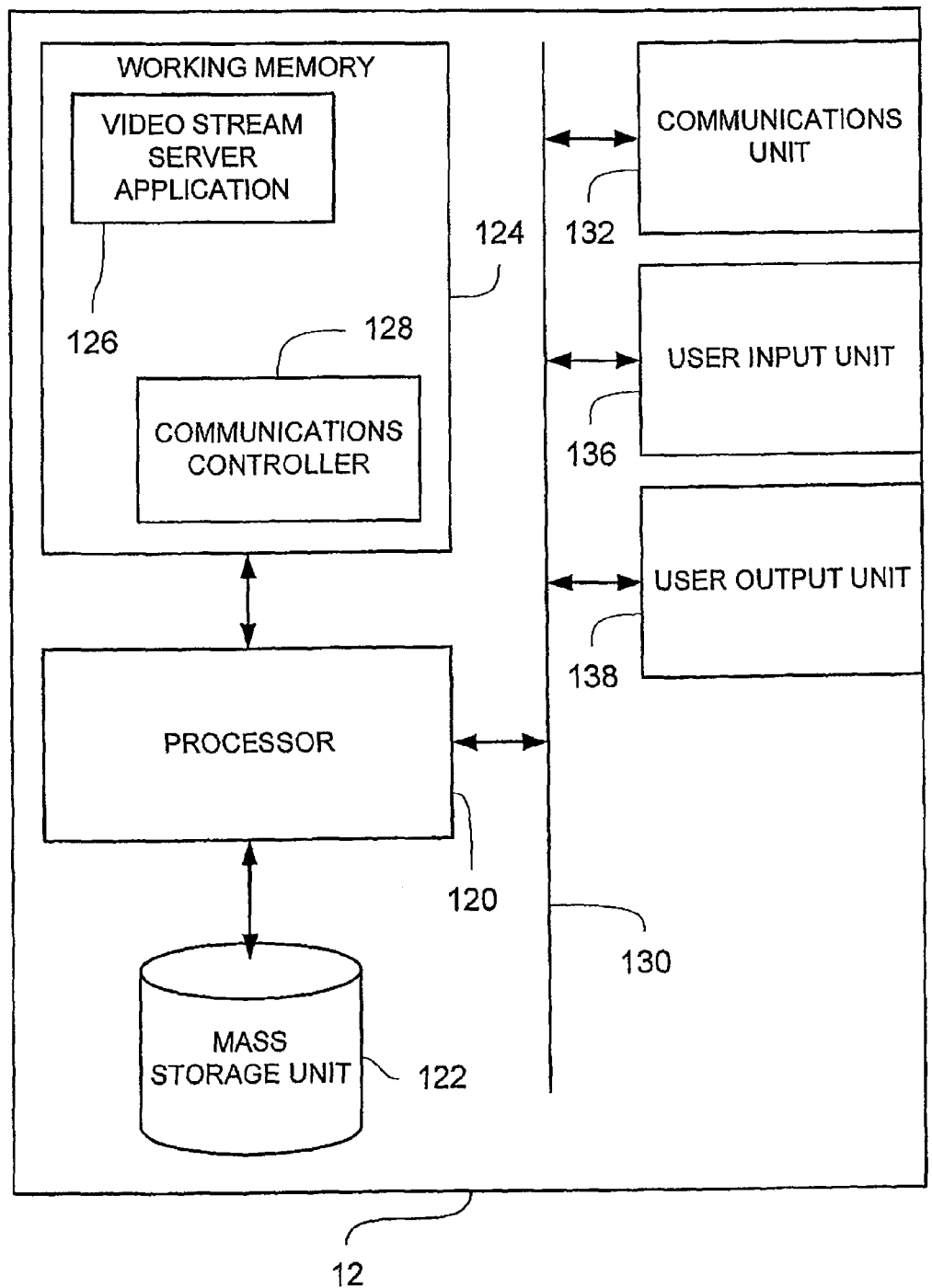
FIG. 2 is a schematic block diagram of a video server of the system illustrated in FIG. 1.

FIG. 2 illustrates the video stream server 12 in further detail. The video stream server 12 can be viewed as a computer apparatus, with the usual general purpose components, including a processor 120 with access to a mass storage unit 122. The mass storage unit 122 will, in use, store video files which are made available for serving to consumer units on request.

The server 12 also includes a working memory 124, storing applications for execution by the processor 120, including a video stream server application 126. A communications controller application 128 is also illustrated which, when executed by the processor 120, causes the processor 120 to carry out commands relating to the establishment of communications with other devices, such as consumer units, as required. To this end, the server 12 comprises a communications unit 132, comprising hardware enabling communications with other devices. This is accessed by the processor via a bus 130. Also provided, and in connection with the bus 130, are a user input unit 136 (which may comprise a keyboard, a mouse, other input devices as required) and a user output unit 138 (such as a video display output) to allow human interaction with the server 12 as required.

Figure 3:
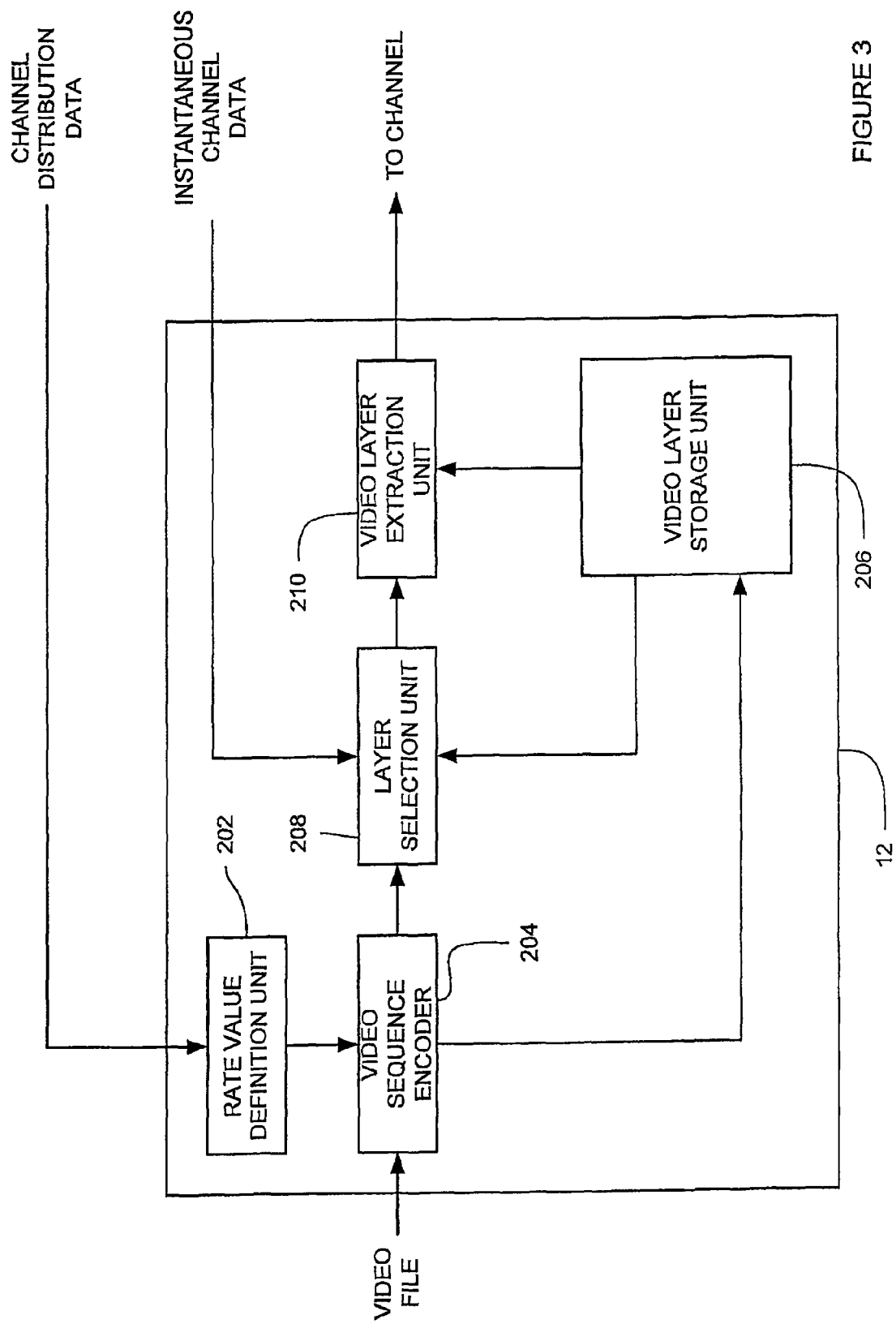
FIG. 3 is a schematic functional block diagram of the video server illustrated in FIG. 2.

On execution of the video stream server application 126, the video server 12 provides a processing architecture as illustrated in FIG. 3. It will be appreciated by the reader that the presently described embodiment, involving software executed by a general purpose computer, may be only one way of implementing this, and a more application specific hardware architecture may equally be appropriate.

In the broadest sense, the video server 12 designs specific rates (and/or QP values) based on knowledge of the prevailing conditions of the communications channel. In the described embodiment, this is obtained ("channel distribution data") based on the feedback from the channel.

A rate value definition unit 202 receives this channel distribution data and, on the basis of this representation of the prevailing conditions of the communications channel, provides rate values to a video sequence encoder 204. The video sequence encoder 204 creates video layer files from a video file, on the basis of the rate values. The layer files are stored in a video layer storage unit 206.

Once the layer files have been created and stored, the video sequence encoder 204 initiates operation of a layer selection unit 208 which refers to the layer files stored in the video layer storage unit 206 to make a decision on the number of layers, from the total available video stream data, to drop from the proposed transmission. This is carried out on the basis of "instantaneous" channel data.

The reader will appreciate that the terms "prevailing" and "instantaneous" are used here to provide contrast between the long-term view taken in establishing the layers, and the short-term view taken in using the layers on a particular transmission. It will be understood that the terms should not be viewed as indicating any particular time-bound, but rather a difference in approach. In particular, the term "prevailing" is not intended to mean an infinitely long analysis of past performance—it is sufficient that a measure be provided on the basis of which an understanding of the capabilities of the channel can be obtained. On the other hand, the term "instantaneous" is not intended to imply an infinitely short observation window—performance over a relatively small number of packets of information may be considered sufficient in some contexts whereas a longer view might be more appropriate in other implementations. The exact implementation will be within the control of the designer.

Then, a video layer extraction unit 210 extracts the selected layers from the video layer storage unit 206 and assembles them into a data stream for transmission.

The rate value definition unit 202 selects the rate parameters such that the expected transmission rate of the video transmission system is maximised. Given a particular number of video layers, the expected transmission rate of the system is given by the weighted probability of transmitting at the different extractable rates of the encoded sequence, where the probability of transmitting at different rates can be calculated based on the statistics of the channel.

This is achieved by executing an optimisation problem where the objective is to maximise the expected transmission rate and the optimisation variables are the rates for extracting different layers, i.e., the vector r.

A simple representation of the optimisation problem is:

$$\text{maximise} \sum_{l=1}^{L} r_l P(R = r_l)$$

where $P(R=r_l)$ is the probability of transmitting at a rate $r_1$. Such a problem can be solved in a number of different ways. For instance, convex programming techniques can be used for solving the optimisation problem if the problem is concave. Alternatively, if the problem is not strictly concave, numerical methods can be used to converge to the optimal rate vector by restricting the range over which such numerical methods operate.

The probability that a particular video layer will be transmitted is linked with the average transmission rate of the channel. Thus, if the channel has a lower than average transmission rate for the application in question, then layers corresponding to relatively high quality playback will generally have a low probability of being transmitted.

Thus, it will be understood by the reader that solving the optimisation problem as set out above will specify a base layer rate that can be met over the given channel with a high probability. Accordingly, the expected transmission rate using the optimal rate values should generally be above the base layer rate.

Put simply, the process of determining the manner in which the source data should be separated, is governed by the prevailing condition of the channel, whereas the actual step of determining which layers are to be transmitted continues to be governed by the instantaneous condition of the channel. Another way of expressing this is that the setting up of the rate values involves taking a long term assessment of the performance of the channel, whereas the use of the rate values so established is conducted using a short term assessment of local channel conditions. The question of what is long term and what is short term will depend on the actual implementation, as will be understood by the reader.

Alternatively, the optimisation of the expected transmission rate based on the channel statistics, determined through feedback from the channel and receiver, can be used to define the number of extractable rate points that should be present in the bitstream. It is known that increasing the number of video layers in an encoded sequence results in a lower video compression ratio, although a higher adaptability of the encoded sequence to fluctuations in the channel would then be possible. However, as the number of extractable rate points, or video layers, increases, the rate requirements of respective layers converge. Consequently, the probabilities of transmitting these different rates become smaller.

As such, increasing the number of video layers causes a decrease in the gain in expected rate achievable through solving the optimisation problem. The described method of finding the optimal rate vector r for maximum expected rate can be modified such that the number of video layers in the encoded sequence is an optimisation variable as well. In this approach, a constraint would be included in the problem formulation that would specify the minimum gain in expected transmission rate necessary for a larger number of video layers to be considered.

The described optimisation problem can be readily applied to wireless transmission systems in which transmit power is limited due to an interference threshold, for example in dynamic spectrum access networks. The only difference in approach would be in the probability of transmitting at different rates. In such an interference constrained system, the transmit probability of the different rates also needs to cater for the maximum allowable interference level as seen by a third-party device.

Figure 4:
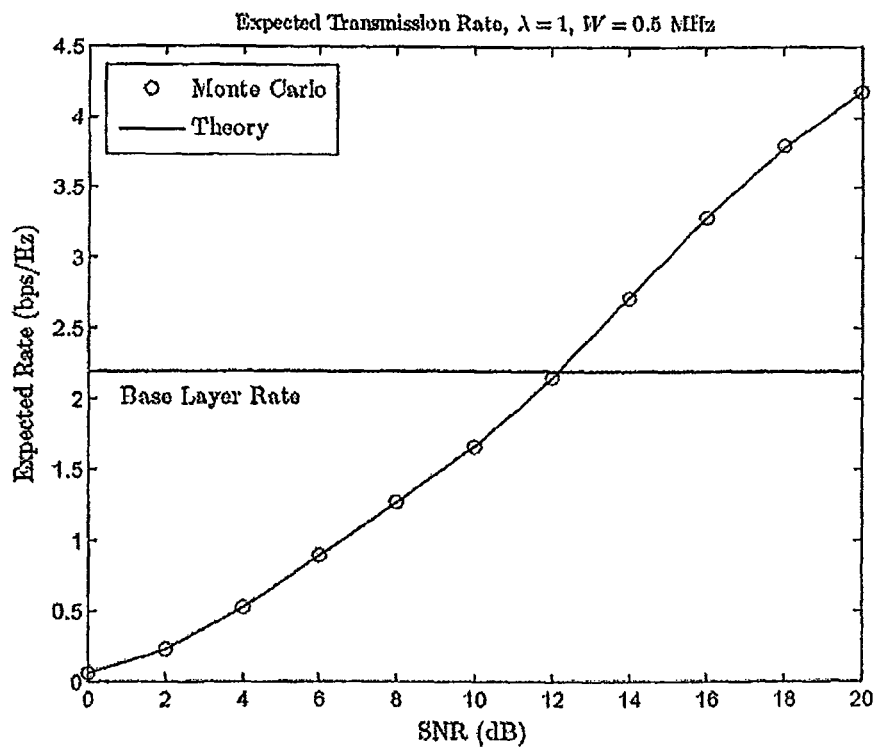
FIG. 4 is a graph illustrating performance of a comparative example for illustrative purposes.

A comparative example will now be described, where the extractable rate points of the scalable video sequence are set irrespective of the channel conditions. In this example, the sequence is encoded in 3 layers where the extractable rate points in kilobits per seconds are 1100, 2500 and 4800 respectively. The transmission bandwidth is 0.5 MHz. Assuming a Rayleigh fading channel, the expected transmission rate of such a system is analysed for different signal-to-noise-ratio (SNR) values. FIG. 4 shows the expected transmitted rate relative to the base layer rate this system. It can be observed from the plot that, for a large range of SNR values (up to 12 dB), the base layer rate lies above the expected transmission rate. The interpretation of this observation is that, on average, the transmission rate is below the base layer rate, which means that the probability of no video layers being transmitted (transmit rate of 0) is quite high.

Figure 5:
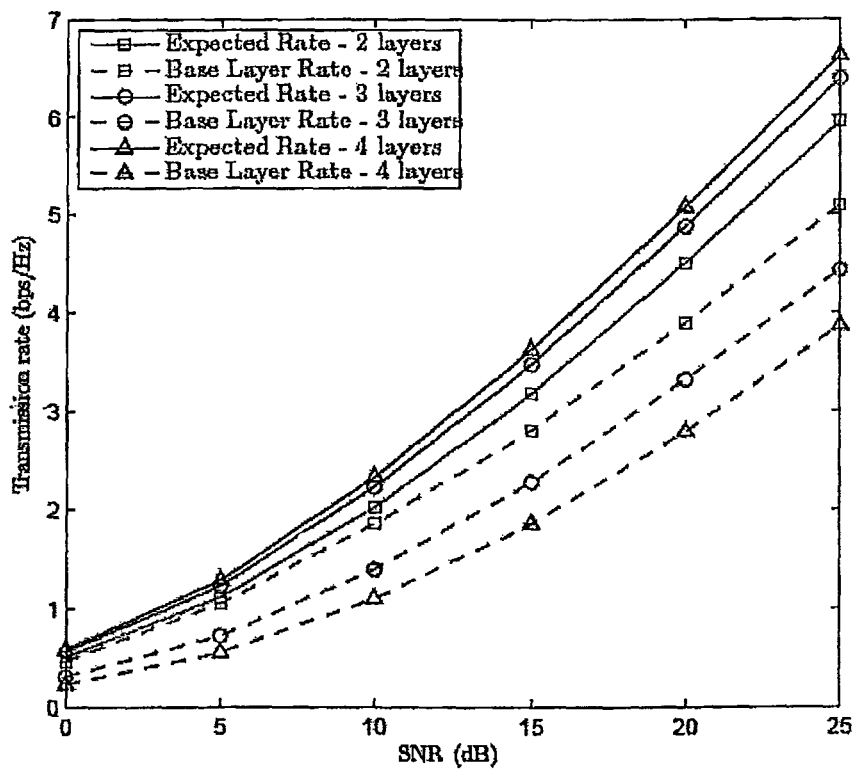
FIG. 5 is a graph illustrating performance of an example in accordance with the described embodiment.

On the other hand, an analysis of the expected transmission rate relative to the base layer rate, using a method in accordance with the described embodiment, is illustrated in FIG. 5. This example is established under the same simulation conditions as the comparative example set out above, for sequences encoded in different numbers of video layers.

It can clearly be seen from the plot in FIG. 5 that the base layer rate is always below the average transmission rate. This indicates a reduced prospect of the mutual information of the channel being lower than the base layer rate, irrespective of the number of video layers present. The figure also demonstrates that the described method of optimising to produce rate points can take advantage of better channel conditions to yield a higher expected transmission rate than that possible with fixed rates.

Figure 6:
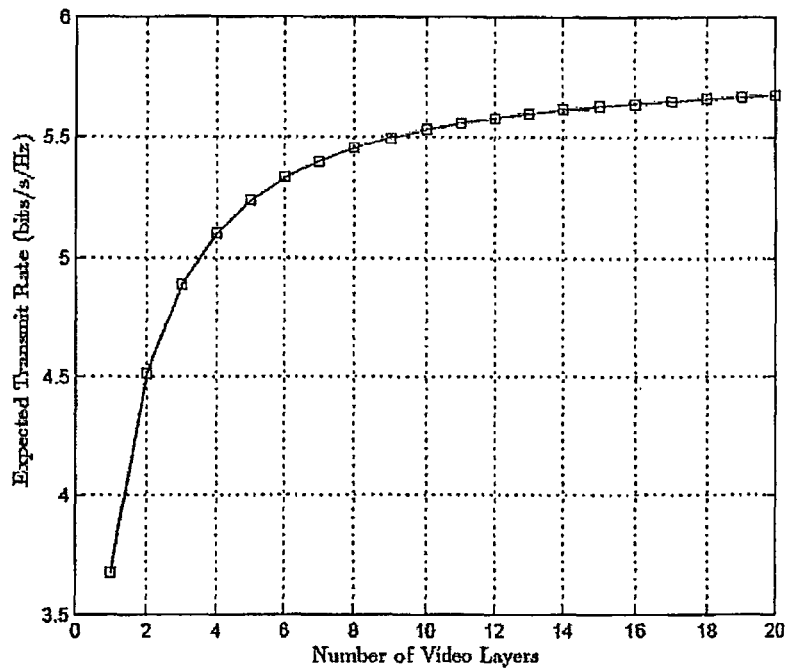
FIG. 6 is a graph further illustrating performance of the aforementioned example.

FIG. 6 shows a plot of the maximum expected transmission rate obtained by solving the optimisation problem for different numbers of video layers. It can be observed from the plot that, as the number of video layers increases, there is a diminishing return in terms of gain in the expected transmission rate. So, one possible advantage of this feature of the described embodiment is that an upper limit can be defined for the number of layers which should be created in content files to be transmitted on a given channel. This can have impact on design of encoders, and places a ceiling on the likely demand for computationally complex multi-layer encoding.

Certain embodiments such as described herein may lead to lower probability of the base layer rate not being satisfied and higher expected transmission rate. Higher expected transmission rate is equivalent to a higher spectrum utilisation. Given the scarcity of frequency spectrum, the latter advantage may have significant impact on wireless multimedia transmission.

Figure 7:
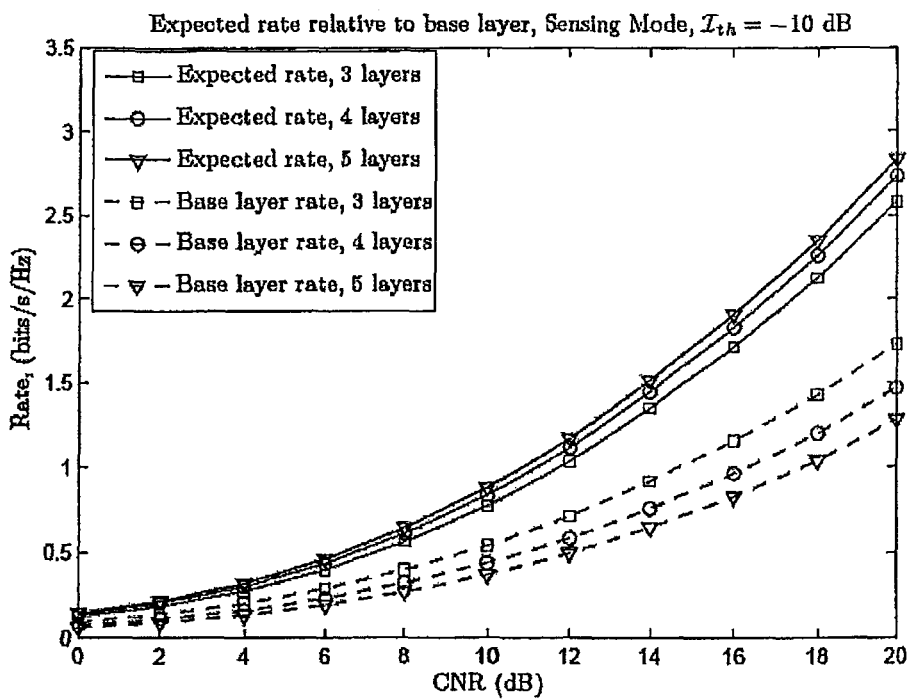
FIG. 7 is a graph further illustrating performance of the aforementioned example.

FIG. 7 shows a graph of optimal expected transmission rate obtained for a spectrum overlay radio network, where the secondary (overlay) user imposes an interference constraint of −10 dB on the third-party radio. In this case, the embodiment first computes the transmit probability given the interference threshold prior to optimising for the rate vectors as described above. Even in this case, the expected transmission rate is above the base layer rate for the scenarios considered. As previously stated, this is indicative of a low probability of the base layer rate not being satisfied.

While certain embodiments have been described, these embodiments have been presented by way of example only, and are not intended to limit the scope of the inventions. Indeed, the novel methods, apparatus and systems described herein may be embodied in a variety of other forms; furthermore, various omissions, substitutions and changes in the form of the methods, apparatus and systems described herein may be made without departing from the spirit of the inventions. The accompanying claims and their equivalents are intended to cover such forms or modifications as would fall within the scope and spirit of the inventions.

The invention claimed is:

1. A method of processing a source data item to produce a transmission data item for transmission on a communications channel, the transmission data item bearing information defining a playback content item, the method comprising:

encoding information defining a source data item into a plurality of layer data items, including a base layer item and an enhancement layer item, the base layer item defining a playback content item corresponding to said source data item at a first quality level and the enhancement layer item providing information to define, with said base layer, a playback content item corresponding to said source item at a quality level higher than the first quality level, the encoding comprising determining a plurality of rate values defining transmission rates corresponding, respectively, to transmission of said base layer item alone or said base layer item and said enhancement layer item, on the basis of a prevailing channel condition of the communications channel, and producing an encoded base layer item and an encoded enhancement layer item on the basis of said determined rate values by maximizing a weighted sum of probabilities of transmitting at specific rates;

extracting, from said encoded layer items, a set of encoded layer items for transmission, the extracting being on the basis of current channel information for the communications channel; and assembling said extracted encoded layer items into a data sequence for transmission.

2. A method in accordance with claim 1 wherein said maximising comprises performing a convex optimisation.

3. A method in accordance with claim 1 wherein said encoding comprises encoding said source data item into said base layer item, said enhancement layer item, and further one or more successive enhancement layer items, each of said one or more successive enhancement layer items being combinable with preceding layer items to produce a playback content item of successively higher quality than the preceding layer item.

4. A method in accordance with claim 1 wherein a number of rate values to be determined is pre-determined.

5. A method in accordance with claim 1 wherein a number of rate values is determined by reference to prevailing channel conditions.

6. A method in accordance with claim 5 wherein a number of rate values is determined by optimisation with reference to prevailing channel conditions.

7. A non-transitory computer readable medium storing computer executable instructions operable, when executed by a general purpose computer, to cause the computer to perform a method in accordance with claim 1.

8. An encoder for processing a source data item to produce a transmission data item for transmission on a communications channel, the transmission data item bearing information defining a playback content item, the encoder comprising:

a data processor operable to encode information defining a source data item into a plurality of layer data items, including a base layer item and an enhancement layer item, the base layer item defining a playback content item corresponding to said source data item at a first quality level and the enhancement layer item providing information to define, with said base layer, a playback content item corresponding to said source item at a quality level higher than the first quality level, the data processor comprising a rate value determiner operable to define transmission rates corresponding, respectively, to transmission of said base layer item alone or said base layer item and said enhancement layer item, on the basis of a prevailing channel condition of the communications channel, and wherein said data processor is operable to produce said base layer item and said enhancement layer item on the basis of said determined rate values by maximizing a weighted sum of probabilities of transmitting at specific rates;

an extractor for extracting, from said encoded layer items, a set of layer items for transmission, the extractor being operable to extract said set of layer items on the basis of current channel information for the communications channel; and a data sequence assembler operable to assemble said selected encoded layer items into a data sequence for transmission.

9. An encoder in accordance with claim 8 wherein said optimiser is operable to maximise by performing a convex optimisation.

10. An encoder in accordance with claim 8 wherein said data processor is operable to encode said source data item into said base layer item, said enhancement layer item, and further one or more successive enhancement layer items, each of said one or more successive enhancement layer items being combinable with preceding layer items to produce a playback content item of successively higher quality than the preceding layer item.

* * * * *